April 12, 1960   D. D. NYE, JR., ET AL   2,932,777
TRANSDUCER
Filed Dec. 6, 1955
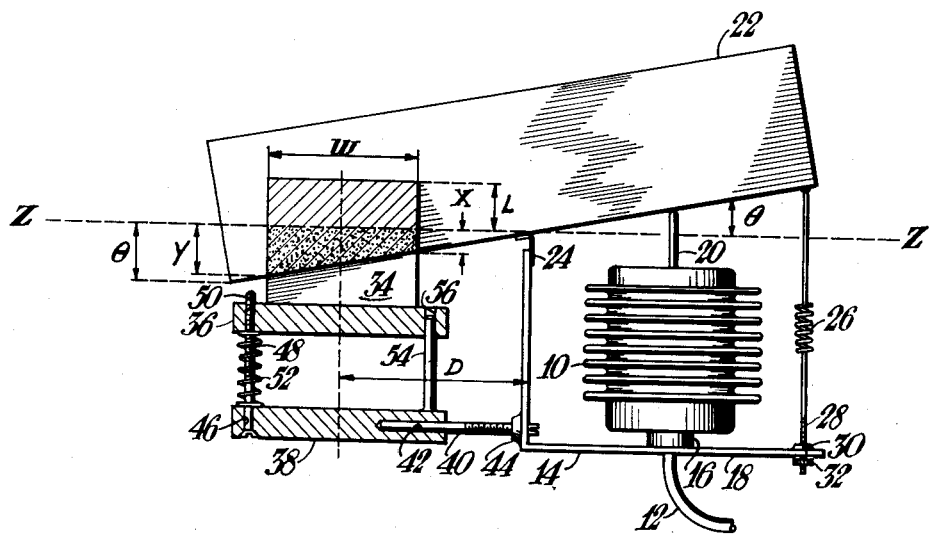
INVENTORS.
Dudley D. Nye Jr. and Edward J. Ross.
BY
THEIR ATTORNEY.

United States Patent Office 2,932,777
Patented Apr. 12, 1960

2,932,777
TRANSDUCER

Dudley D. Nye, Jr., Philadelphia, and Edward J. Ross, McKeesport, Pa., assignors to Robertshaw-Fulton Controls Company, Richmond, Va., a corporation of Delaware Application December 6, 1955, Serial No. 551,370

4 Claims. (Cl. 317—246)

This invention relates generally to transducers and more particularly to apparatus for converting a mechanical motion, indicative of a physical quantity, to electrical capacitance with linear action and non-interacting zero and span adjustment.

Devices of this general character have been utilized to measure and control various conditions and generally include means for converting a condition into a force for displacing a lever or a plate. Movement of the lever or plate is then sensed for direction and amplitude by measuring the impedance at the terminals of a variable impedance device actuated by said lever or plate. There are many inherent disadvantages in these present day motion to capacitance transducers and most notable has been the inability of the transducer to linearly convert the motion signal to a capacitance signal over the full operating range of the transducer without the use of specially shaped capacitor plates and/or complicated and expensive gears and mechanical linkages.

Another disadvantage of prior devices is the interaction between a zero adjustment, where the value of capacitance for a given reference value of the physical quantity is adjusted, and the span adjustment, where the change of capacitance for a given change in the physical quantity is adjusted. In similar fashion, the conventional span adjustment device, for varying the range of capacitance values possible for the range of values of the condition to be measured, induces changes in the transducer system which seriously affect the linear proportionality of the motion to capacitance values.

The present invention comprises a capacitor having a rotatable plate and a horizontal and vertically adjustable plate for cooperation therewith for varying the capacity therebetween, upon rotation of the rotatable plate. An actuating means in the form of a condition responsive device serves to rotate the rotatable plate in accordance with variations in the condition. The geometry of the relative positioning of the plates is such as to effect a linear increase of the common area of the plates with respect to corresponding increase in the condition and also to permit span adjustment and zero adjustment without affecting the overall linearity of the system or interaction between said adjustments. Therefore it is the principal object of the present invention to proportionately convert a displacement indicative of a condition to be measured into capacitance.

Other objects and advantages will become apparent from the following description taken in connection with the accompanying drawing which is a schematic view of a displacement to capacitance transducer embodying the invention.

Referring more particularly to the drawing, there is shown a bellows 10 having a capillary 12 communicating therewith for conveying fluid from a source of pressure (not shown), the variance of which is indicative of a condition to be indicated or controlled. The bellows 10 is mounted on a bracket 14 by a boss 16 secured to the end of the bellows 10 and a wall 18 of the bracket 14. The other end of the bellows 10 is provided with a transmission shaft 20 secured centrally of the bellows 10 and in axial alignment therewith.

The shaft 20 serves to transmit mechanical actuation of the bellows 10 during expansion or contraction thereof caused by the varying pressure within the bellows 10, for each change in the condition to be measured or controlled. As illustrated, the shaft 20 is adapted to abut one edge of a control lever 22 which is suitably hinged at the one edge on the bracket 14 by a flexure plate 24. A coil spring 26 is held in tension between one end of the leg 18 and one end of the lever 22 for restraining actuation of the bellows 10 within the elastic limits thereof. One end 28 of the spring 26 is threadedly received in a tapped bore 30 formed on the arm 18 and is adapted to cooperate with a nut 32 for adjusting the tension of the spring 26.

The control lever 22 is in the form of a rectangular capacitor plate adapted to be rotated about the pivot 24 and has the one edge passing through pivot 24 disposed in a straight line. The angular rotation of lever 22 about pivot 24, it will be evident, is proportional to the expansion or contraction of the bellows 10. A second capacitor plate 34 cooperates with the other end of the lever 22 remote from the connection of the shaft 20 therewith. The plate 34 is substantially rectangular in form, has two parallel side edges and has one end thereof secured to a mounting block 36 by any suitable means for movement therewith. Plate 34 is disposed with one surface thereof slightly spaced from one surface of lever 22 and with the one straight edge of lever 22 being positioned transverse of the length of the two parallel edges thereof.

Means is provided for moving the capacitor plate 34 with respect to the lever plate 22 for varying the capacity therebetween and takes the form of a block 38 adjustably mounted upon the bracket 14 by a screw 40 having one end adapted for rotation but axially retained in a bore 42 formed in one end of the block 38 and the other end adapted to be rotatably retained in an internally threaded boss 44 formed in the bracket 14.

The other end of the block 38 remote from the bore 42 is provided with an opening 46 formed transversely of the block 38 for slidably and rotatably receiving an adjusting screw 48. The screw 48 is threadedly received in a tapped bore 50 formed in the block 36 and serves to adjust the vertical positioning of the block 38, and consequently, the plate 34 with respect to the lever plate 22. A coil spring 52 encircles the screw 48 and is held in compression between the blocks 36 and 38 for eliminating any slack between the threaded portions of the screw 48 and the block 36. A centering pin 54 secured to the block 38 is adapted to be slidably received in bore 56 formed in the block 36 for maintaining the alignment of the blocks 36, 38 for all adjusting manipulations of the screws 40 and 48.

In operation, the common area between the plates 22 and 34, which is shown to be in the shape of a trapezoid, may be varied according to the pressure within the bellows 10. Since capacitance is proportional to the opposing area of capacitor plates, the capacity between the plates 22, 34 will be proportional to the common area thereof. As the lever 22 is rotated in accordance with the pressure in the bellows 10, the common area will vary in proportion to the pressure changes and in turn the capacitance between the plates 22, 34 will likewise vary in proportion to the pressure change. The following mathematical analysis of the pressure to capacitance variation is applied to the present invention to indicate the direct proportionality between the condition and the capacitance value.

As illustrated in the drawing, it will be seen by inspection that $$X = \left(D - \frac{W}{2}\right) \tan \theta \quad (1)$$

and $$Y = \left(D + \frac{W}{2}\right) \tan \theta \quad (2)$$

where X and Y are the distances between the horizontal axis Z—Z through the pivot 24 and the points where the edges of the plates 22 and 34 coincide, W is the width of the plate 34, $\theta$ is the angle between the axis Z—Z and the edge of the plate lever 22, and D is the distance between the vertical axis of the plate 34 and the pivot 24. From this, it will be apparent that the area of the dotted portion is $$A_t = \frac{Y}{2}\left(D + \frac{W}{2}\right) - \frac{X}{2}\left(D - \frac{W}{2}\right) \quad (3)$$

and substituting Equations 1 and 2 for X and Y, respectively, Equation 3 becomes $$A_t = \frac{\left(D + \frac{W}{2}\right)^2 \tan \theta - \left(D - \frac{W}{2}\right)^2 \tan \theta}{2} \quad (4)$$

Considering now the rotation of the plate 22 by the bellows 10, it will be seen that $\tan \theta = K_1 p - K_2$ where $K_1$ and $K_2$ are dimensional constants and $p$ is the pressure within the bellows 10. This is exactly true if the vertical movement of shaft 20 is directly proportional to the condition being measured and shaft 20 remains vertical. A slight tilt of shaft 20 will give but a negligible error in the linearity of the device. Substituting this value for $\tan \theta$ in Equation 4 the dotted area becomes $$A_t = WD(K_1 p - K_2) \quad (5)$$

and the total common area of the plates 22, 34 becomes $$A_c = LW + WD(K_1 p - K_2)$$
$$= W(L + K_1 D p - K_2 D)$$
$$= W[(L + D(K_1 p - K_2)] \quad (6)$$

where L is the distance between the axis Z—Z and the upper edge of the plate 34.

Thus, the common area $A_c$ of the plates 22 and 34 and the capacitance therebetween is directly proportional to and varies linearly with the width W of the plate 34, the distance D, the length L and the pressure $p$ respectively. However since the values for W, D and L are pre-set constants, the capacity between the plates 22, 34 is a linear function of the pressure "$p$" only.

It will be seen that when the movable plate 22 is horizontal, that is, when the lower edge thereof is coincident with the axis Z—Z, $K_1 p - K_2 = 0$ and the total common area becomes $A_c = WL$ therefore a change in the span adjustment D, which is accomplished by rotating the screw 40, will not affect the common area of the plates 22 and 34 and capacitance therebetween. It will be apparent that the range of capacitance values between the plates 22, 34 may be varied by adjustment of plate 34 toward or away from the pivot 24. However, the midpoint of this range will remain the same as long as the vertical positioning of the plate 34 is not disturbed. Therefore, the range of values for the capacitance between the plates 22, 34 may be varied for the range of pressure changes to be experienced by the bellows 10 without affecting the mid-pressure capacitance value.

The mid-pressure capacitance, may be likewise varied by rotating the screw 48 in order to adjust the vertical positioning of the plate 34 with respect to the plate 22. In this manner, the mid-pressure capacitance value may be varied without affecting the range of capacitance corresponding to the range of pressure changes in the bellows 10.

It is to be understood that the present invention is not limited to single capacity plates 22, 34 but may be arranged to include a plurality of intermeshing parallel plates for each of the plates 22, 34 if greater capacitance variation is desired. As illustrated in the drawing, the plate 34 is positioned so that the pivot 24 is intermediate the plate 34 and the bellows 10. From this, it will be apparent that clockwise rotation of the movable plate 22 caused by an increase in the pressure in the bellows 10 will serve to increase the common area of the plates 22, 34 and consequently the capacity therebetween. It will be apparent that, the plate 22 may be positioned on the same side of the pivot 24 as is the bellows 10 to effect a decrease in the capacitance between the plates 22, 34 for increases in pressure without departing from the scope of the invention.

It will also be apparent that other condition to motion actuators may be used instead of the bellows 10, such as, bimetal actuators, Bourdon tubes or the like, for imparting rotation to the plate 22 in accordance with the changes in a condition and that the illustrated embodiment of this invention may be variously changed and modified, or features thereof, single or collectively, embodied in other combinations than the illustrated embodiment without departing from the scope of the invention, and that accordingly the disclosure herein is illustrative only and the invention is not limited thereto.

We claim:

1. A variable capacitor responsive to variations in a physical quantity, comprising a first capacitor plate having at least two parallel edges defining a plane surface therebetween, a pivotal capacitor plate having a plane surface disposed substantially perpendicular to the pivotal axis thereof and having a straight edge passing through said pivotal axis, said plates being in spaced face-to-face relation with said straight edge extending transversely of said parallel edges and defining a common area for said plates in a reference position of said pivotal plate, actuating means operatively connected for displacing said pivotal plate from said reference position in proportion to deviations in the physical quantity and thereby varying said common area, means for adjusting said first plate along the plane surface of said pivotal plate laterally of said pivotal axis for varying the range of reference capacitance without varying said common area, and means for adjusting said first plate transversely of said pivotal axis for varying said common area without varying the range of reference capacitance.

2. A variable capacitor as claimed in claim 1 wherein said pivotal plate is of elongated rectangular form with said straight edge defining one side between the opposite ends of the rectangle, said first plate being substantially square and positioned with said parallel edges within the boundary defined by said opposite ends.

3. A variable capacitor responsive to variations in a physical quantity, comprising a support, a first capacitor plate carried by said support having at least two parallel edges defining a plane surface therebetween, a pivotal mounting adjacent said support having an axis spaced laterally from one of said parallel edges and substantially midway of the length thereof, a pivotal capacitor plate mounted on one edge intermediate the ends thereof on said axis and having a plane surface extending substantially perpendicular thereto in spaced face-to-face relation with said plane surface of said first plate, said one edge extending transversely of said parallel edges and defining a common area for said plates in a reference position of said pivotal plate, actuating means on said support including a movable member engageable with said one edge for displacing said pivotal plate obliquely from said reference position in proportion to deviations in the physical quantity and thereby varying said common area, first adjusting means extending between said pivotal mounting and said support and operable for moving said first plate along the plane surface of said pivotal plate to vary the spacing of said one edge to said pivotal axis without varying said common area, and second adjusting means extending between said support and said first plate and operable for moving said first plate across the plane surface of said pivotal plate substantially parallel to said pivotal mounting for varying said common area.

4. A variable capacitor as claimed in claim 3 wherein said pivotal plate is of elongated rectangular form, said first plate being substantially square and positioned with said parallel edges within the boundary defined by said ends of said pivotal plates.

References Cited in the file of this patent

UNITED STATES PATENTS

| | | |
|---|---|---|
| 1,536,453 | Pickard | May 5, 1925 |
| 2,008,832 | Leonard | July 23, 1935 |
| 2,474,387 | Wallace | June 28, 1949 |

FOREIGN PATENTS

| | | |
|---|---|---|
| 228,006 | Great Britain | Jan. 29, 1925 |
| 458,691 | Great Britain | Dec. 24, 1936 |